US010936738B1

(12) United States Patent
Roberts et al.

(10) Patent No.: US 10,936,738 B1
(45) Date of Patent: Mar. 2, 2021

(54) MODERATOR TO EXTEND APPLICATION FUNCTIONALITY

(71) Applicant: Amazon Technologies, Inc., Seattle, WA (US)

(72) Inventors: Dustin Roberts, Redmond, WA (US); Aaron Dyjach, Monroe, WA (US); Linen Neal Liu, Woodinville, WA (US); Alejandro Villegas, Mount Vernon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 15/633,666

(22) Filed: Jun. 26, 2017

(51) Int. Cl.
*G06F 21/62* (2013.01)
*H04L 29/06* (2006.01)
*G06F 21/60* (2013.01)
*G06F 21/78* (2013.01)

(52) U.S. Cl.
CPC ........ *G06F 21/6218* (2013.01); *G06F 21/606* (2013.01); *G06F 21/62* (2013.01); *G06F 21/78* (2013.01); *H04L 63/0428* (2013.01); *H04L 63/105* (2013.01)

(58) Field of Classification Search
CPC ... H04L 63/0428; H04L 63/105; G06F 21/62; G06F 21/606; G06F 21/6218; G06F 21/105; G06F 21/78
See application file for complete search history.

(56) References Cited

U.S. PATENT DOCUMENTS

| 8,826,304 | B2* | 9/2014 | Harm | G06F 9/541 |
| | | | | 719/313 |
| 9,465,837 | B1* | 10/2016 | Ross | G06F 16/245 |
| 10,592,683 | B1* | 3/2020 | Lim | G06F 21/604 |
| 2007/0005613 | A1* | 1/2007 | Singh | G06Q 20/40 |
| 2007/0294253 | A1* | 12/2007 | Strub | H04L 63/102 |
| 2008/0319909 | A1* | 12/2008 | Perkins | G06Q 10/00 |
| | | | | 705/50 |
| 2009/0030845 | A1* | 1/2009 | Hurry | G06Q 20/3829 |
| | | | | 705/71 |
| 2011/0099200 | A1* | 4/2011 | Blount | G06F 21/32 |
| | | | | 707/770 |
| 2011/0209196 | A1* | 8/2011 | Kennedy | G06F 21/60 |
| | | | | 726/1 |

(Continued)

OTHER PUBLICATIONS

HBase—Overview. https://www.tutorialspoint.com/hbase/hbase_overview.htm. pp. 1-4. Retrieved Nov. 2019. (Year: 2019).*

(Continued)

*Primary Examiner* — John M Macilwinen
(74) *Attorney, Agent, or Firm* — Davis Wright Tremaine LLP

(57) ABSTRACT

A moderator is provided that obtains a set of operations from an application in a first format. The moderator may determine sensitive information is included in an operation of the set of operations. The sensitive information may be obfuscated by at least an interaction between the moderator and another computer system and/or service. Furthermore, the set of operations may be translated to a set of translated operation in a second format, where the set of translated operations include obfuscated sensitive information.

21 Claims, 8 Drawing Sheets

(56) References Cited

U.S. PATENT DOCUMENTS

| | | | | |
|---|---|---|---|---|
| 2014/0137222 A1* | 5/2014 | Nguyen | ................... | G06F 8/60 |
| | | | | 726/7 |
| 2015/0006730 A1* | 1/2015 | Helfman | ............... | G06F 9/5072 |
| | | | | 709/226 |
| 2015/0212895 A1* | 7/2015 | Pawar | .................. | G06F 16/128 |
| | | | | 707/649 |
| 2018/0052867 A1* | 2/2018 | Seiden | ................. | G06F 16/188 |
| 2018/0255101 A1* | 9/2018 | Adam | ................... | H04L 9/3247 |
| 2019/0130122 A1* | 5/2019 | Barnes | ............... | G06F 12/1408 |

OTHER PUBLICATIONS

Chung, WC., Lin, HP., Chen, SC. et al. "JackHare: a framework for SQL to NoSQL translation using MapReduce" Autom Softw Eng. pp. 489-508. (Year: 2014).*

Fotache, Marin and Cogean, Dragos. "NoSQL and SQL Databases for Mobile Applications. Case Study: MongoDB versus PostgreSQL". Informatica Economicä vol. 17, No. 2/2013. pp. 41-58. (Year: 2013).*

* cited by examiner

MODERATOR TO EXTEND APPLICATION FUNCTIONALITY

BACKGROUND

A data center is a facility that houses computer systems and various networking, storage, and other related components. Data centers may, for example, provide computing services to businesses and individuals as remote computing services or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. In addition, these services may leverage other services and computing resources to provide functionality. For example, two or more services may communicate over various networks using various computing resources distributed among various data centers to perform an operation of a particular service.

In a large distributed computing system (e.g., multiple distributed data centers) of a computing resource service provider, various customers, users, services, and resources of the computing resource service provider are in frequent communication with each other. Keeping the system secure, connected, and easy to use becomes more challenging as applications and services are updated and as the complexity and usage of the system increases. In such distributed computing systems, it can be difficult to coordinate and enable communications between computing resources of the system and various commercial, off-the-shelf applications or other applications. Furthermore, it can also be difficult to reliably secure and set up computing resources of the system to communicate and function with certain applications. Additionally, many conventional systems rely upon manual setup, monitoring, and modification to ensure that these applications function correctly. The complexity and distribution of computing resources in these environments may make it difficult to set up, manage, and organize relationships of the computing resources and applications.

BRIEF DESCRIPTION OF THE DRAWINGS

Various techniques will be described with reference to the drawings, in which.

DETAILED DESCRIPTION

Figure 1:
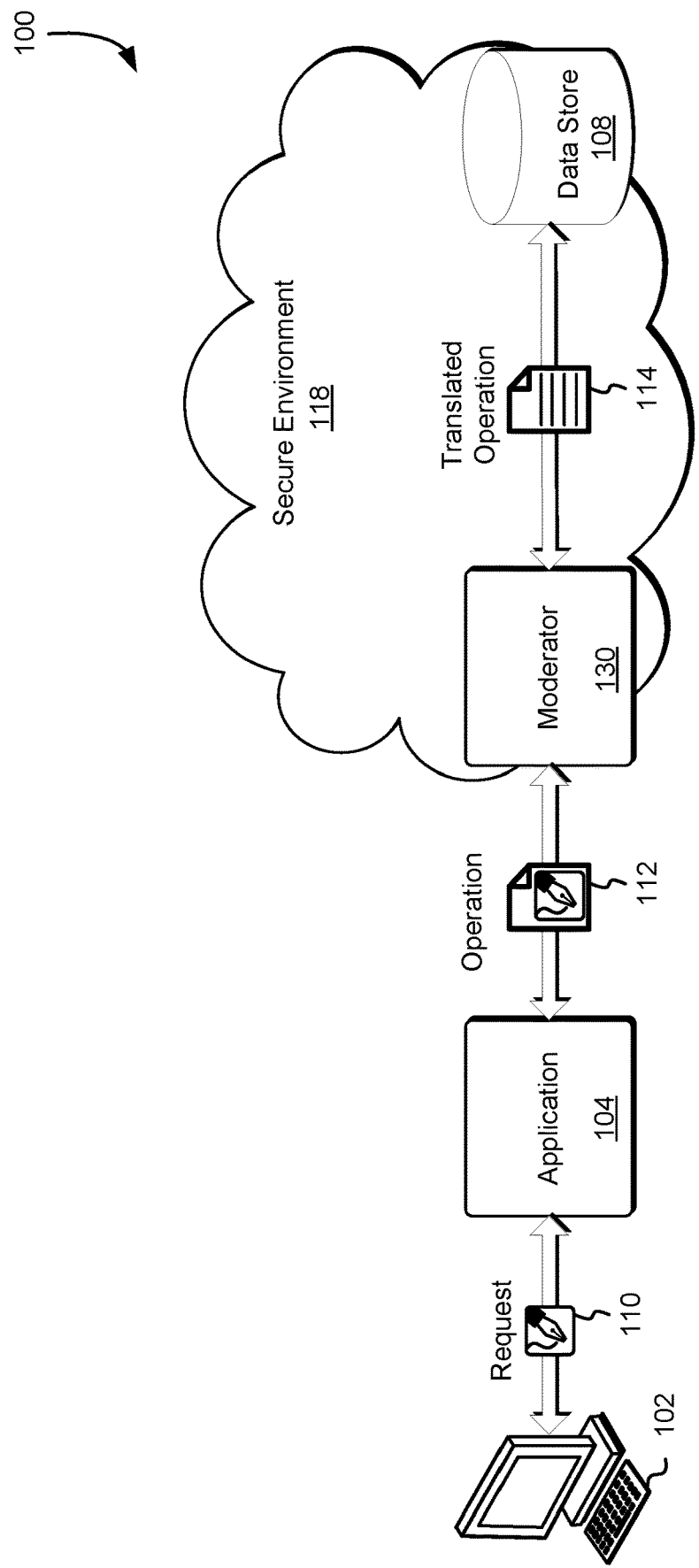
FIG. 1 illustrates an environment in which a moderator service translates an operation of an application to be processed by a data store in accordance with at least one embodiment.

In various examples described below, a moderator service enables applications including commercial, off-the-shelf applications to integrate with additional computing resources, such as databases or other data stores, that the applications were not designed to integrate with. For example, a particular application is developed by a developer to use a particular type of Structured Query Language (SQL) database that does not support tokenization/encryption of data maintained in the database. In this example, an instance of the moderator service can be created to provide the missing functionality. Specifically, the instance of the moderator service may be provisioned, for example, using computing resources of a computing resource service provider and emulate a connection and/or communications between the application and the database. In this manner, the moderator service can receive communications from the application without having to modify the operation of the application. For example, if the application is developed to use a particular programming language, such as PostgreSQL, to communicate with a data repository, the moderator can emulate a PostgreSQL database and accept communications from the application in PostgreSQL.

In various embodiments, the moderator parses commands and other communications from the application and performs various operations. For example, the moderator receives a command from the application in a first programming language and translates the command to a second programming language. In various embodiments, translating a command and/or operation involves additional information and/or additional operations in addition converting the command from a first syntax to a second syntax. In one example, the moderator translates a database command to a set of application program interface (API) calls using additional information not included in the database command. In another example, the moderator translates a database command to be processed by a schemaless database including modifying the schema information included in the database command. As a result, translation operations described in the present disclosure may include both translation between programming languages and modification of the translated commands. This may be advantageous because the moderator can extend the functionality and compatibility of the application. Specifically, a particular application developed to interact with a relational database can be extended to work with a non-relational database based at least in part on a moderator accepting commands from the application in a format to interact with the relational database and translating the commands to interact with the non-relational database. In this way, entities are not restricted to particulars of third party applications such as programming languages, databases, data stored devices, data types, security requirements, policies, or any other attribute of third party applications.

In addition, the moderator service may interact with other services of a computing resource service provider to improve and/or extend the functionality of applications. For example, the moderator service receives a command from an application and parses the command to detect if sensitive data is included in the command. If sensitive data is detected, the moderator service may then interact with a data custodian service and/or cryptography service to encrypt or otherwise tokenize the sensitive data. In various embodiments, the moderator service communicates with various services of the computing resources service provider to process a command or operation received from the application. For example, the moderator service can access a credential service to manage credentials for the application and/or associated data store (e.g., database), a certificate service to manage certificates for the application and/or associated data store, or other services.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a moderator 130 may translate an operation of an application 104 to function with a data store 108 in accordance with an embodiment. As described in greater detail below, a computing resource service provider may provide the moderator 130, through a moderator service, to enable users 102 (e.g., customers of a third party application) to extend and/or improve the functionality of the application 104. For example, the user 102 interacts with a fraud detection application through various requests 110 and the fraud detection application is designed (e.g., the third party developer wrote the source code of the application to operate in a particular manner) to interact with a particular backend database. The moderator 130 may extend the functionality of the fraud detection application by enabling interaction with a different type of backend database or an entirely different storage solution such as an on-demand storage service.

In various embodiments, the application 104 includes any application developed by an entity other than the user 102 or another application to which the user 102 does not have access to the source code or is otherwise limited in the amount of development or control the user 102 has over the application 104. For example, the application 104 may be a tax application, a database application, payment systems application, retail application, fraud prevention and detection application, troubleshooting application, or various other applications. The application 104 may be executed by various computing resources such as physical host computer systems including processors, memory, storage devices, or any other computing resources necessary for executing the application 104. For example, the physical host computer system includes a hypervisor or other virtualization layer to provide the moderator with access to the underlying physical computing resources of the physical host computer system. Furthermore, the computing resources (e.g., physical host computer system) used to execute the application 104, in various embodiments, is provided by the computing resource service provider.

The user 102, in various embodiments, includes a customer of a computing resource service provider leveraging the application 104 to perform various operations such as providing an application or service of their own. For example, the user 102 provides an online retail webpage and used the application 104 to provide a portion of the online retail webpage. In yet other embodiments, the user 102 includes an entity leveraging computing resources of the computing resource service provider to execute the application 104 and provide a service. For example, the entity may be a work group of the computing resource service provider providing a media streaming service and using the application 104 to provide fraud detection and/or a payments system for the media streaming service.

In various embodiments, the moderator 130 is an instance of a moderator generated by a moderator service. In such embodiments, the user 102, through a management console as described in greater detail below, causes the instance of the moderator 130 to be instantiated to interface between the application 104 and the data store 108. In some embodiments as described in greater detail below, the moderator interfaces with additional services to process various operations 112 of the application. The moderator 130 may be executed by various computing resources such as physical host computer systems including processors, memory, storage devices, or any other computing resources necessary for executing the moderator 130. For example, the physical host computer system includes a hypervisor or other virtualization layer to provide the moderator with access to the underlying physical computing resources of the physical host computer system. Furthermore, the computing resources (e.g., a physical host computer system) used to execute the moderator 130, in various embodiments, is provided by the computing resource service provider.

In addition, as illustrated in FIG. 1, the environment 100 includes a data store 108. As described in greater detail below, the data store 108 may include a variety of different data storage device and/or data storage services. For example, the data store 108 includes a database provided by the computing resource service provider. In another example, the data store 108 is an instance of a database provided by a database service of the computing resource service provider. In yet another example, the data store 108 is a storage device provided by an on-demand storage service of the computing resource service provider. Furthermore, the data store 108 may be executed by one or more physical computing resources and/or a virtualization thereof. The data store 108, in some embodiments, is operated by the user 102 and provisioned to store data generated by and/or otherwise used by the application 104 or other applications, services, and/or operations on behalf of the user 102.

Returning to FIG. 1, the environment 100 also includes a secure environment 118. The secure environment, in various embodiments, includes computing resources secured from or otherwise restricted to one or more entities. For example, the secure environment 118 includes a virtual private network isolated from one or more other networks such as the Internet. Furthermore, the secure environment 118 may utilize encrypted communication channels to secure communications between computing resources within the secure environment 118. In various embodiments, computing resources (e.g., the moderator 130 and data store 108) utilize authentication, such as digital certificates, to maintain the secure environment 118. In addition, a policy service or other computing resources may enforce access control polices or other policies within the secure environment 118 to maintain the security and integrity of the secure environment 118. In general, the secure environment 118 may include any environment or set of computing resources secured or otherwise restricted from at least one other computing resource of entity.

As illustrated in FIG. 1, the user 102, through a computing device, causes a request 110 to be transmitted to the application 104. The request 110 may include a request to the application 104 to perform an action or operation. For example, the request 110 includes a request to store user 102 information. In another example, the request 110 includes a database query and operation to be performed on a result of the database query. The request 110 may include any request, command, service call, API call, notification, or other communication with the application 104 that causes the application to perform one or more operations 112. The operations 112 may include a variety of different operations that may be executed in serial, parallel, or any combination thereof. For example, the operation 112 includes a set of operations on a data object to manipulate the data object. In another example, the operation 112 includes generating a database query, searching a database by at least submitting the database query to a backend database, and returning a result. In general, the operation 112 includes any operation that can be performed by a computer system based at least in part on the execution of an application.

As described in greater detail below, the moderator 130 may parse the operation 112 and generate a translated operation 114 to enable the operation to be, at least in part, performed and/or fulfilled by the data store 108. The translated operation 114, in an embodiment, includes the operation in a format and/or syntax distinct from the operations 112 and capable of being processed by the data store 108 or other computing resources (e.g., computing resources implementing the data store). For example, the operation 112 is a database query in accordance with PostgreSQL and the moderator 130 parses the query, determines information associated with the query (e.g., whether the query includes data to be decrypted or whether a certificate is needed to access the database containing the queried data), and translates the query to an SQL query to generate the translated operation 114 so the translated operation 114 can be processed by the data store 108. The translated operation 114 can be in any format such as Extensible Markup Language (XML), JavaScript Object Notation (JSON), or any other format that can be processed by a computer system.

The moderator 130 by translation operations enables the user 102 to interface the application 104 with other applications, services, hardware, or other computing resources that the application 104 without modification is otherwise incapable of communicating with and/or interfacing with. In various embodiments, the moderator 130 emulates an endpoint (e.g., backend database) or other computing resources the application 104 is capable of communicating with. For example, the moderator 130 emulates a PostgreSQL database and accepts a connection from the application 104 so that the application 104 can submit operations 112 directly to the moderator 130. The moderator 130, by emulating a particular computing resource, allows the application 104 to function as designed without requiring the application 104 to be modified. In addition, the moderator 130, in various embodiments, can parse the syntax of the operation 112 received from the application 104 and determine the appropriate syntax to enable the application 104 to communicate with other computing resources, such as the data store 108.

The emulation provided by the moderator 130, in various embodiments, allows modifications to the other applications, services, hardware, or other computing resources the application 104 utilizes. In one example, the application 104 utilizes a single backend data storage repository, the moderator 130 enables the user 102 to modify the backend data storage repository to be a distributed backend data repository and provide data redundancy and/or lower network latency in a distributed system. In this example, the moderator 130 maintains metadata and distributes operations 112 and/or translated operations 114 to the appropriate backend repository of the distributed backend data repository. Similarly, in another example, the user 102 can utilize the moderator 130 to isolate a portion of the backend data repository, such as the portion of the backend data repository that contains sensitive and/or critical information. Furthermore, the moderator 130 may be executed in an isolated execution environment such as Security-Enhanced Linux (RTM).

In various embodiments, the application 104 is managed by an entity distinct from the user 102. For example, the application 104 is provided by a subsidiary or contractor providing the application 104 as a service to the user 102 or other application or service provided by the user 102. In these scenarios, the process of integrating the subsidiary's or contractor's application is facilitated by the moderator 130 based at least in part on the moderator translating the operations 112 into translated operations 114. The operations 112 may include operations on distinct data objects (e.g., a file or table element) or groups of data objects (e.g., a folder or column of a database table). Similarly, the translated operations 114 may include operations on distinct data objects or groups of data objects. Furthermore, the moderator 130 may include a plurality of operations 112 into a single translated operations 114 and/or generate a plurality of translated operations 114 from a single operation 112.

Figure 2:
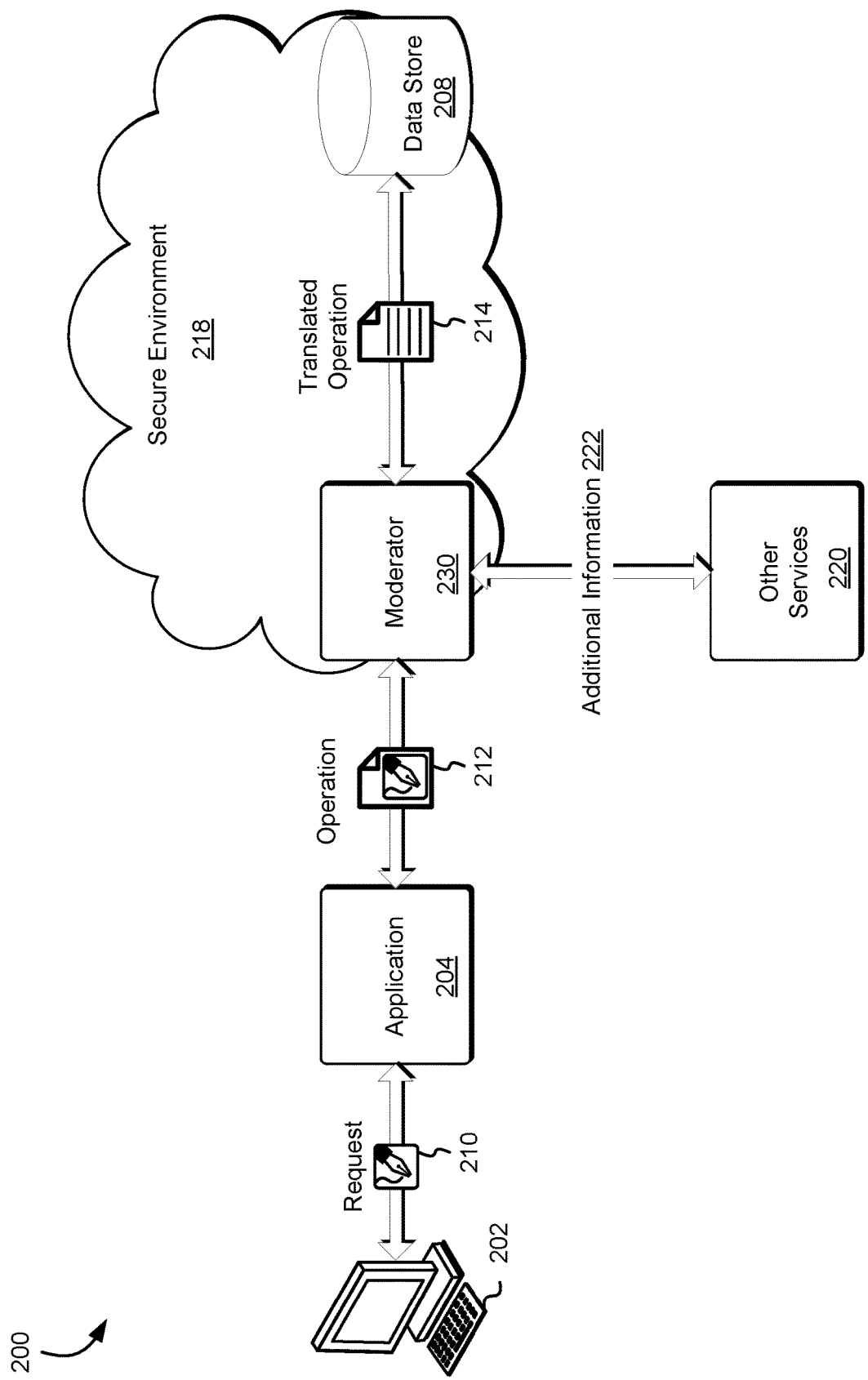
FIG. 2 illustrates an environment in which a moderator service translates an operation of an application to be processed by a data store based at least in part on information from other services in accordance with at least one embodiment.

FIG. 2 illustrates an environment 200 in which a moderator 230 may translate an operation of an application 204 to function with a data store 208 based at least in part on additional information 222 in accordance with an embodiment. The environment 200 includes a user 202 transmitting requests 210 to an application 204, which cause the application to perform operations 212 that are obtained by the moderator 230 and used to generate translated operations 214 which are then processed by a data store 208 as described above in connection with FIG. 1. Furthermore, the environment 200 as illustrated by FIG. 2 includes other services 220 which provide additional information 222 which, in various embodiments, is used to generate the translated operations 314. As described above in connection with FIG. 1, the moderator 230 and other entities illustrated and/or described in connection with FIG. 2, may execute within a secure environment 218.

A computing resource service provider may provide the moderator 230, through a moderator service, to enable users 202 (e.g., a customer of a third party application) to extend and/or improve the functionality of the application 104. For example, the user 202, through the moderator 230, extends the functionality of the application 204 to include functionality of the other services 220. The other services 220 may include any of the services described in greater detail below. In addition, the functionality provided to the application 204 by the other services 220 may include any of the functionality described in greater detail below including data storage, databases, encryption, policy control, certificates, authentication, authorization, fraud detection, compute resources, data processing, tokenization, or any other functionality provided by a service and/or application.

In various embodiments, the moderator 230 obtains additional information 222 from the other services and modifies at least a portion of the operations 212 based at least in part on the additional information 222. In one example, the moderator 230 obtains authentication information from the other services 220 to authenticate the operation 212 to the data store 208. In another example, the operations 212 contains sensitive information that is obfuscated, the moderator 230 then obtains unobfuscated sensitive information from the other services 220 and replaces the obfuscated sensitive information in the operation 212 with unobfuscated sensitive information in the translated operation 214. In yet another example, the moderator obtains the additional information 222 associated with the operation 212 (e.g., user 102 account information, address, identification information, or other additional information) and includes the additional information 222 in the translated operation. The additional information 222 may include metadata associated with the moderator 230, the application 204, the user 202, the operation 212, the data store 208, the other services 220, or any other information suitable for translating operations.

As described above, the moderator 230 may obtain the operation 212 and parse the operation to determine what additional information 222 to obtain. For example, the moderator 230 parses the operation 212 and determines, based at least in part on a database schema associated with the application 204 and metadata associated with the user 202, that a particular data field in the database is maintained by the other services 220. As a result of this determination, the moderator 230 obtains the additional information 222 including the particular data field to complete the operation 212 and generate the translated operation 214. In this manner, the moderator 230 manipulates data and/or the operation 212 during the process of completing the operation 212.

Figure 3:
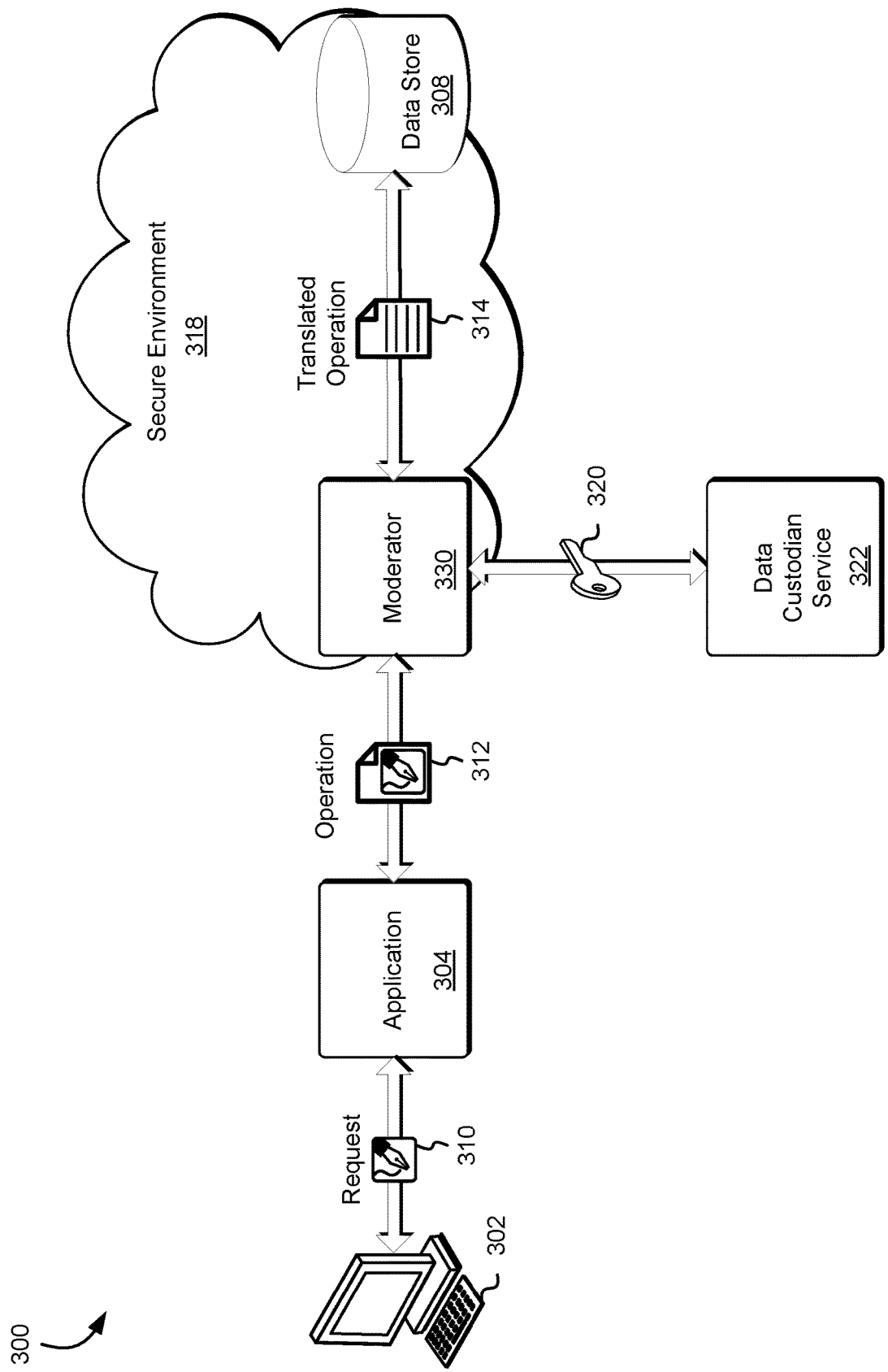
FIG. 3 illustrates an environment in which a moderator service translates an operation of an application to be processed by a data store based at least in part on information from a data custodian service in accordance with at least one embodiment.

FIG. 3 illustrates an environment 300 in which a moderator 330 may use a cryptographic key 320 to encrypt a portion of an operation in accordance with an embodiment. The environment 300 include a user 302 that transmits a request 310 to an application 304, which cause the application 304 to perform an operation 312. The operation 312 is obtained by the moderator 230 and used to generate a translated operation 214 which is then processed by a data store 308 as described above in connection with FIG. 1. Furthermore, the environment 300 as illustrated by FIG. 3 includes a data custodian service 322 which provides the cryptographic key 320 which, in various embodiments, is used to protect sensitive information included in the operation 312. In yet other embodiments, the cryptographic key 320 is used to decrypt sensitive information, for example, when the application 304 and/or user 302 is requesting plaintext versions of the sensitive information. As described above in connection with FIG. 1, the moderator 330 and other entities illustrated and/or described in connection with FIG. 3 may execute within a secure environment 318.

As described above, a computing resource service provider may provide the moderator 330, through a moderator service, to enable users 302 (e.g., customer of a third party application) to extend and/or improve the functionality of the application 304. For example, the user 302, through the moderator 330, uses the data custodian service 322 to tokenize or otherwise protect data generated by the application 304 and/or maintained in the data store 308. In various embodiments, the user 302 provides the moderator 330 with an indication of a particular data type, data fields, and/or other attributes of data that indicate when data is considered sensitive and operations to perform to protect sensitive information. In one example, the user 302 indicates to the moderator 330 that customers' tax identification numbers are to be tokenized such that the information is represented as "XXX-XX-XXXX" and customer addresses are to be encrypted with the cryptographic key 320.

In various embodiments, the moderator 330 provides the data to be secured to the data custodian service 322. For example, the moderator 330 parses the operation 312, detects sensitive information, provides the sensitive information to the data custodian service 322, and obtains secured sensitive information to include in the translated operation 314. As described in the present disclosure, the sensitive information includes any information indicated as sensitive by the user 302, such as identification information, payment information, personal information, tax information, governmental information, or any other information that may be protected or otherwise considered sensitive and/or critical. In addition, various methods of obfuscating, encryption, tokenizing, or otherwise protecting or reducing the fidelity of the sensitive information is considered within the scope of the present disclosure.

In some embodiments, the user 302 transmits the request 310 to obtain sensitive information from the data stored 308. In such embodiments, the moderator may obtain the cryptographic key 320 from the data custodian service 322 to decrypt the sensitive information and provide the decrypted data to the application 304. For example, the operation 312 includes a search of the data store 308 for sensitive information. The moderator 330, in this example, generates a translated operation 314 that returns the sensitive information from the data store 308 and then may either obtain the cryptographic key from the data custodian service 322 to decrypt the sensitive information or may transmit the sensitive information to the data custodian service 322 such that the data custodian service 322 can decrypt the sensitive information. Furthermore, the data custodian service 322 may provide key rotation or other mechanisms for ensuring the protection of sensitive information. In addition, the moderator 330 may perform additional operations to ensure the protection of sensitive information. For example, the moderator 330 may periodically or a periodically perform a scan of the data store to determine if any sensitive information is unencrypted.

In various embodiments, the moderator 330 may return tokenized or otherwise protected sensitive information to the application 304. For example, the user 302 request customer contact information based on customer identification information, the result of the request may include additional information such as customer phone number or customer payment information that the moderator 330 may leave tokenized or otherwise protected when returning a result to the application 304. This may be because, for example, the user 302 does not have permission to access customer payment information but does have permission to access customer contact information.

Figure 4:
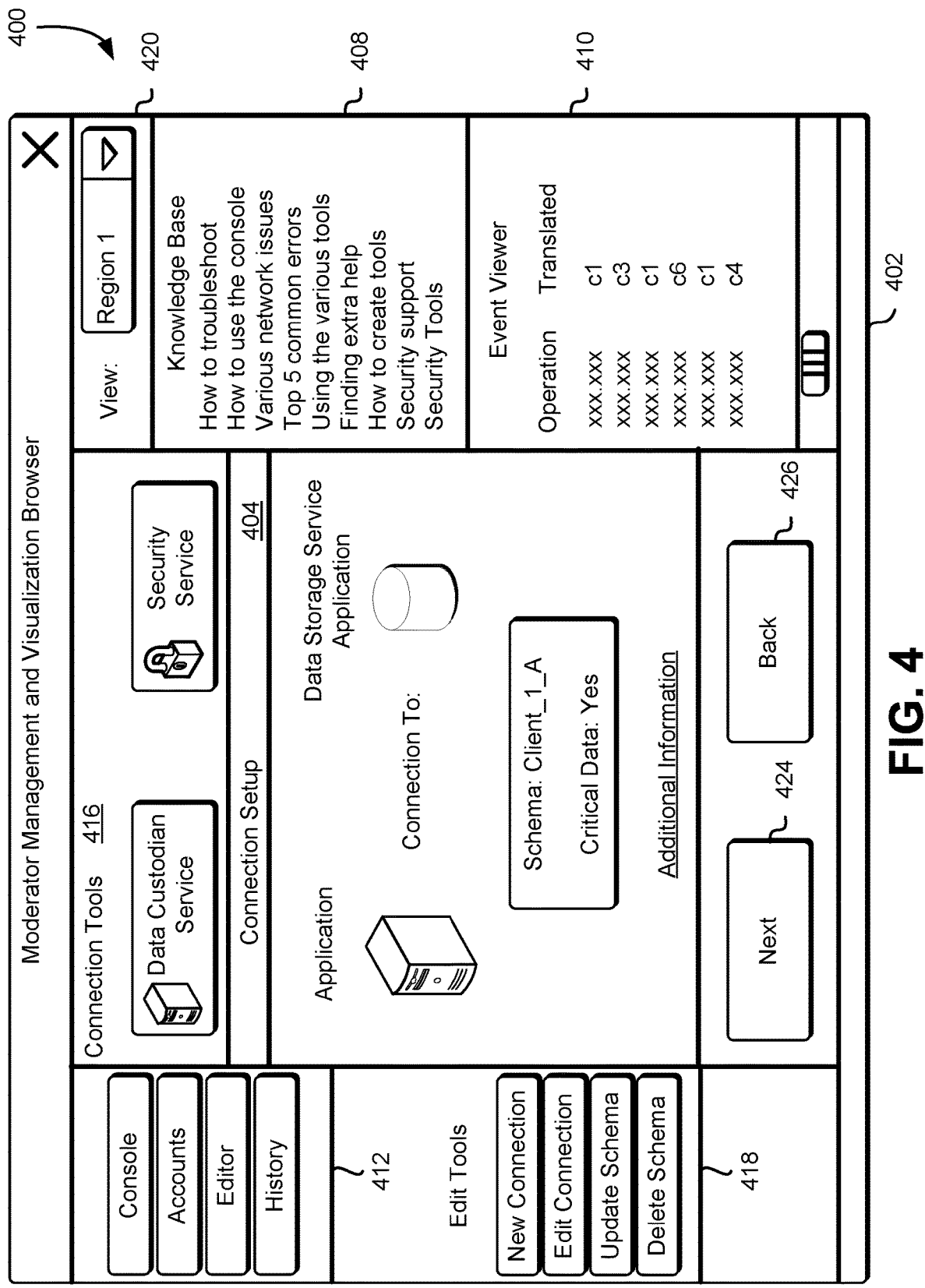
FIG. 4 is a diagram illustrating a management console exposed as a webpage for creating an instance of a moderator service to facilitate communications between an application and computing resources in accordance with at least one embodiment.

FIG. 4 illustrates an example environment 400 where a remote moderator management and visualization browser 402 may be used to extend and/or modify the functionality of an application as described in the present disclosure at least as described above in connection with FIG. 1 and in accordance with at least one embodiment. The remote moderator management and visualization browser 402 enables a customer to provide schema information, detect operations performed by an application, detect operations performed by a user, define sensitive information, modify the execution of an application, add functionality to an application, view events associated with an application, search a knowledge base for information related to the computing resources, and extend and/or modify the functionality of an application. In various embodiments, the remote moderator management and visualization browser 402 is a computer system service such as a web service and is provided as a moderator service of the computing resource service provider as described in the present disclosure.

As illustrated in FIG. 4, the remote moderator management and visualization browser 402 is provided as a user interface executed by an application, such as a web browser executing on a computer system operated by the customer, as well as other user interfaces that may be used to present service information and relationship information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The computing resource service provider may receive the selection information from the customer's computing device and provide the information to other computing resources of the moderator service. For example, the customer's definition of sensitive information causes the computing resource executing the remote moderator management and visualization browser 402 to transmit the definition to an instance of a moderator associated with the customer. The user interface may be generated or caused to be generated by the moderator service as described in the present disclosure.

The remote moderator management and visualization browser 402 may include connection tools 416 that aid the customer in generating, establishing, and/or modifying functionality of an application using the remote moderator management and visualization browser 402. For example, the connection tools 416 may include a graphical user interface element, such as the buttons illustrated in FIG. 4, where selection of the graphical user interface element may cause the moderator service to display information to the customer to aid the customer in establishing a particular functionality provided by a particular service or type of service indicated in the button associated with the selected graphical customer element. For example, selection of the 'data custodian service' button causes the remote moderator management and visualization browser 402 to display information in a connection setup 404 display pane of the remote moderator management and visualization browser 402. Based at least in part on the information displayed, the customer may establish a functionality provided by the displayed service, such as data protection.

In yet other embodiments, the moderator service may determine services and functionality that may be established with a particular application based at least in part on the information provided by the customer. For example, the customer may indicate that the application uses a particular SQL language and a particular database type. Based at least in part on this information, the moderator service may determine a set of services, such as a database service, which may be used by the moderator service to replace and/or extend the particular SQL language and/or the particular database type. The moderator service may then cause information associated with the set of services to be displayed in the connection setup 404 display pane. In yet other embodiments, the moderator service determines a set of operations that can be performed by an application and provides information in the connection setup 404 display pane of possible modifications that the moderator can perform to the set of operations.

In various embodiments, the remote moderator management and visualization browser 402 produces the graphical representation of application information based at least in part on a set of events detected by the moderator service. For example, the moderator service causes to be displayed in the remote moderator management and visualization browser 402 operations of the application obtained by an instance of a moderator and the resulting translated operations. In various embodiments as described above, the moderator obtains additional information from other services. In such embodiments, the customer is prompted to provide the other service from which the instance of the moderator is to obtain the additional information. For example, the customer may be prompted to provide logon credentials for a policy management service to enable the moderator to obtain policy information used to translate operations.

As illustrated in FIG. 4, the remote moderator management and visualization browser 402 further includes a set of options 412 used to perform various functions in connection with the remote moderator management and visualization browser 402. The set of options 412 may be a set of functions included in the remote moderator management and visualization browser 402 that enables a customer to perform a variety of operations such as managing accounts, defining database schemas, and managing customer-operated computing resources. The options 412 may be configured as graphical user interface elements of the remote moderator management and visualization browser 402.

The account button may be configured to enable the customer to select particular customer accounts to perform various operations associated with a particular service in connection with the selected customer accounts. In various embodiments, the customer operating the remote moderator management and visualization browser 402 is required to have, at the minimum, complete read permissions across all of the customer services and computing resources associated with the accounts on which the customer is attempting to perform operations associated with the particular service. The editor button may be configured to enable the customer to create or edit database schemas, the definition of sensitive information, and/or modify what information is available to the moderator service.

In various embodiments, the customer is provided with resources to aid in determining what functionality can be added to particular applications and what already established functionality may require attention. The remote moderator management and visualization browser 402 may further include an event viewer 410. The event viewer 410 may be configured to provide information related to operations of the application detected by the instance of the moderator. This information may provide a set of data associated with systemic, operational, or maintenance events associated with the application. For example, the event may include information indicating a particular application attempting to obtain sensitive information from a storage service and whether the attempt was successful based at least in part on a set of permissions managed by a policy management service as described above.

The information displayed in the event viewer 410 may be generated automatically or in response to a request and/or operation of the customer. The remote moderator management and visualization browser 402 may also include a knowledge base 408 which includes articles and provides access to curated content based at least in part on the information collected from customers of the computing resource service provider or generated by the computing resource service provider. The knowledge base may include suggestions on functionality, applications, and/or configurations of services for specific computing resources or suggest relevant database schemas and/or functionality that could be used in connection with various applications. In addition, the moderator service may suggest or recommend particular knowledge-based articles based at least in part on operational information obtained by the instances of the moderator.

The customer may use editing tools 418 to edit, create, or modify existing information and/or metadata maintained by the moderator service. For example, the customer may use the editing tools 418 to edit database schema associated with various applications. In addition, the customer may be provided with the option to build a set of customer specific sensitive information definitions from a set of curated definitions maintained by the computing resource service provider or other entity such as the moderator service. The customer may then modify or edit the sensitive information definitions and/or add new sensitive information definitions.

Once a customer has established a connection to the moderator service through the remote moderator management and visualization browser 402, the remote moderator management and visualization browser 402 may automatically populate the customer's display with the information in various components of the remote moderator management and visualization browser 402, such as the event viewer and knowledge base.

As an operation enabled by the remote moderator management and visualization browser 402, a customer can view different regions from a drop-down menu 420. The different regions may include different geographical regions or different logical regions within the same or different geographical regions. For example, different regions may include two or more separate virtual networks. Customers may navigate to a particular region using a graphical user interface element as illustrated in FIG. 4. Selection of a particular region may limit the information and generate views of information specific to the region. Furthermore, the remote moderator management and visualization browser 402 includes a 'next' button 424 and a 'back' button 426. Selection of the next button 424 may cause the underlying code of the webpage 400 to submit a request to a web service frontend as described above, which causes the web service front end to process information included in the request. Similarly, selection of the back button 426 may cause the underlying code of the webpage 400 to submit a request to the web service frontend to return navigation to a previously navigated webpage. The information displayed in the remote moderator management and visualization browser 402 may be part of a process through which the customer extends or modifies the functionality of an application.

Figure 5:
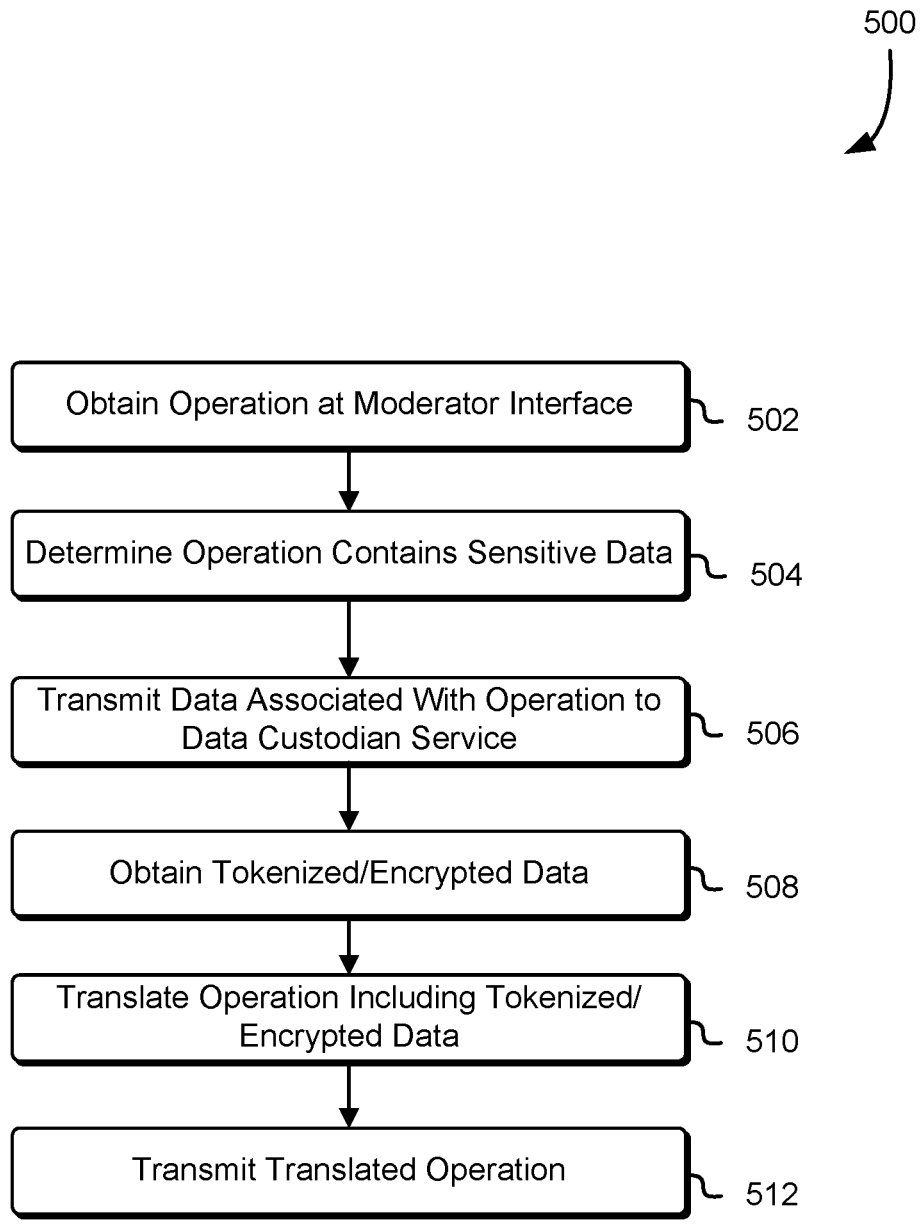
FIG. 5 shows an illustrative process which may be used to translate an operation of an application to be processed by a data store in accordance with at least one embodiment.

FIG. 5 is a block diagram illustrating an example of a process 500 for securing data from an application by a moderator in accordance with at least one embodiment. Some or all of the process 500 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 400 described in conjunction with FIG. 4, such as the moderator 130, by multiple computing devices in a distributed system of a computing resource service provider, or by a service provided by a computing resource service provider. The process 500 includes obtaining an operation at a moderator interface 502. As described above, the moderator may emulate a particular type of connection and/or interface such as a database, web service, API front end, or other interface with an application. In various embodiments, the application and the moderator have previously negotiated a connection. In yet other embodiments, the moderator intercepts operations and/or commands transmitted by the application.

In step 504, the moderator determines the operation that includes sensitive information. In various embodiments, the moderator parses the operation to determine the data types of various data objects indicated and/or included in the operation. For example, as described above, the moderator maintains metadata or other information indicating a database schema utilized by the application and indicating which fields and/or data types contain sensitive information. In various embodiments, other mechanisms for detecting sensitive data and/or determining that sensitive data is included and/or required to process the operation are considered within the scope of the present disclosure.

In step 506, the moderator transmits data associated with the operation to a data custodian service. The data associated with the operation may include sensitive data to be encrypted, tokenized, or otherwise protected. In addition, the data associated with the operation may include a request for a key to encrypt and/or decrypt the sensitive data. In yet other embodiments, the operation includes decrypting or otherwise generating plaintext from encrypted and/or protected sensitive data. In such embodiments, the moderator obtains plaintext or otherwise unprotected data from the data custodian service. The data custodian service may include the data custodian service as described above or other services described in the present disclosure. In one example, the data custodian service maintains information indicating sensitive data and how to tokenize sensitive data.

Returning to FIG. 5, in step 508, the moderator obtains tokenized and/or encrypted data. As described above, tokenized data may include any data for which the fidelity is reduced rendering at least a portion of the data undecipherable. For example, sensitive information such as a customer's address is tokenized such that all of the address but the zip code is replaced with random or pseudorandom characters. In yet other embodiments, the moderator obtains data encrypted using a symmetric or asymmetric encryption algorithm. Furthermore, the tokenized and/or encrypted data may include data to be used during execution of the operation. For example, the tokenized and/or encrypted data may include sensitive data to be stored in a data repository as a result of processing the operation. In another example, the tokenized and/or encrypted data includes information to be processed to complete the operation (e.g., a portion of a SQL query). In this example, the moderator may decrypt encrypted data such that the operation is processed or the operation may be processed using the tokenized data.

In step 510, the moderator translates the operation including the tokenized and/or encrypted data to generate a translated operation. As described above, translating the operation may include parsing the operation in a first format and generating a new operation in a second format. For example, the operation may include a request structured according to an SQL format and the moderator translates the operation to a set of API calls that, when fulfilled, provides the same result as the operation. In another example, the operation is a put operation to store data as an entry in a database and the moderator translates the operation to a storage request operation to an on-demand storage service.

In step 512, the moderator transmits the translated operation to be processed. The moderator may transmit the operation to a service and/or service endpoint. In another embodiment, the moderator transmits the translated operation to the computing resources responsible for processing the translated operation. Note that one or more of the operations performed in 502-512 may be performed in various orders and combinations, including in parallel. For example, the system executing the process 500 may translate the operation and transmit data associated with the operation to the data custodian service in parallel. In numerous variations to the process 500, one or more of the operations 502-512 may be omitted or performed by other systems or services. For example, the moderator may not obtain tokenized and/or encrypted data.

Figure 6:
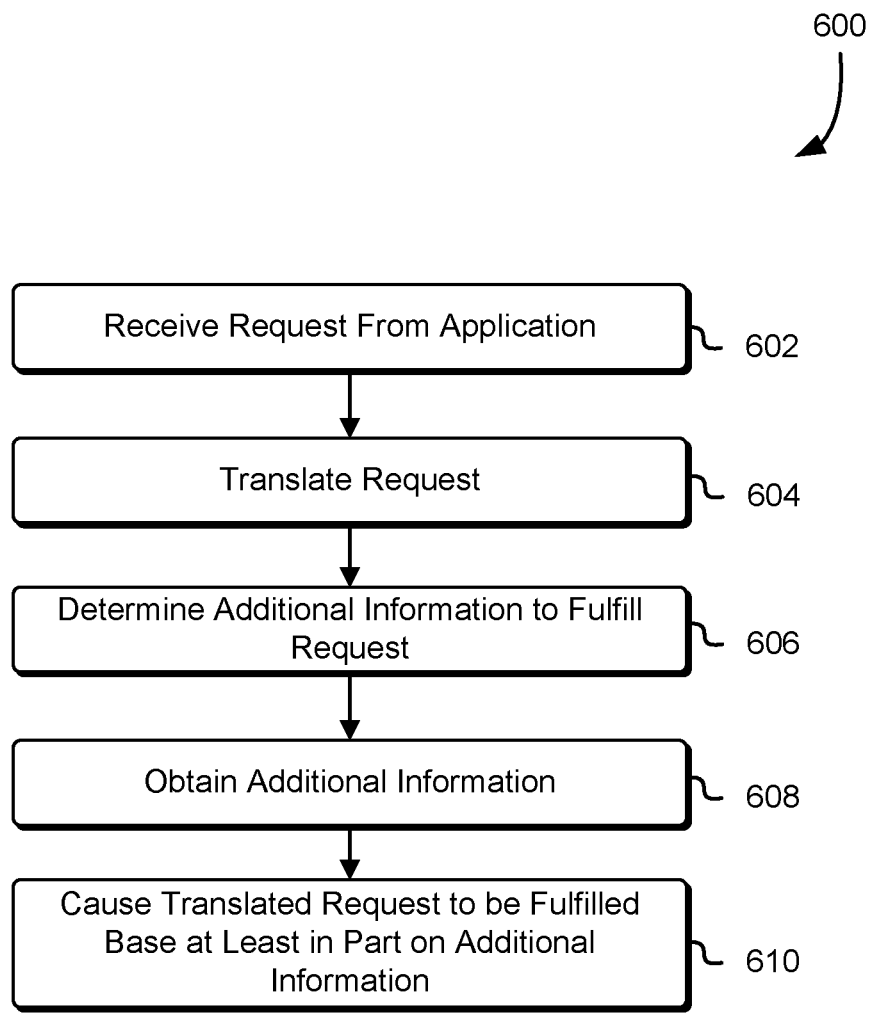
FIG. 6 shows an illustrative process which may be used to translate an operation of an application to be processed by a data store based at least in part on information from other services in accordance with at least one embodiment.

FIG. 6 is a block diagram illustrating an example of a process 600 for extending the functionality of an application by a moderator in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 300 described in conjunction with FIG. 3, such as the moderator 330, by multiple computing devices in a distributed system of a computing resource service provider, or by a service provided by a computing resource service provider. The process 600 includes receiving a request from an application 602. The request may include an operation as described above such as a put or get operation associated with a database, a search query, a data transformation request, or any other request or operation of an application.

In step 604, the moderator may translate the request. As described above, translating the request may include parsing the request and determining information associated with the request based at least in part on a first syntax and generating a translated request, based at least in part on the information associated with the request, in accordance with a second syntax. The syntax, in various embodiments, is defined by a programming language or other formal descriptions of syntax for processing by at least one computing resource.

In step 606, the moderator determines additional information useable to fulfill the request. In one example, the additional information includes a cryptographic key used to decrypt sensitive information used to process the request. In another example, the additional information includes authentication credentials used to access one or more restricted computing resources to fulfill the request. As described in the present disclosure, the additional information includes any information or data that may be obtained for other applications, services, or computing resources that is used to fulfill the request from an application. The additional information, in various embodiments, is obtained from one or more services of a computing resource service provider as described in greater detail below in connection with FIG. 7.

Returning to FIG. 6, in step 608, the moderator obtains additional information used to fulfill the request. For example, the moderator obtains policy information from a policy service, the policy information used to access sensitive data used to fulfill the request. In another example, the moderator obtains additional information maintained by the moderator indicating a database schema used by the application and/or used to store data in a backend repository. The additional information, in some embodiments, is obtained in response to a service call or API call transmitted to a service interface as described in greater detail below in connection with FIG. 7.

In step 610, the moderator causes the translated request to be fulfilled based at least in part on the additional information. In various embodiments, the moderator causes the translated request to be fulfilled by transmitting the translated request including the additional information to a computing resource (e.g., a database) responsible for processing the request. In yet other embodiments, the additional information includes a cryptographic key that the moderator uses to decrypt sensitive information and uses the decrypted sensitive information to fulfil at least a portion of the translated request (e.g., a portion of a complex SQL query included in the request). Note that one or more of the operations performed in 602-610 may be performed in various orders and combinations, including in parallel. For example, the system executing the process 600 may translate the operation and obtain the additional information in parallel. In numerous variations to the process 600, one or more of the operations 602-610 may be omitted or performed by other systems or services.

Figure 7:
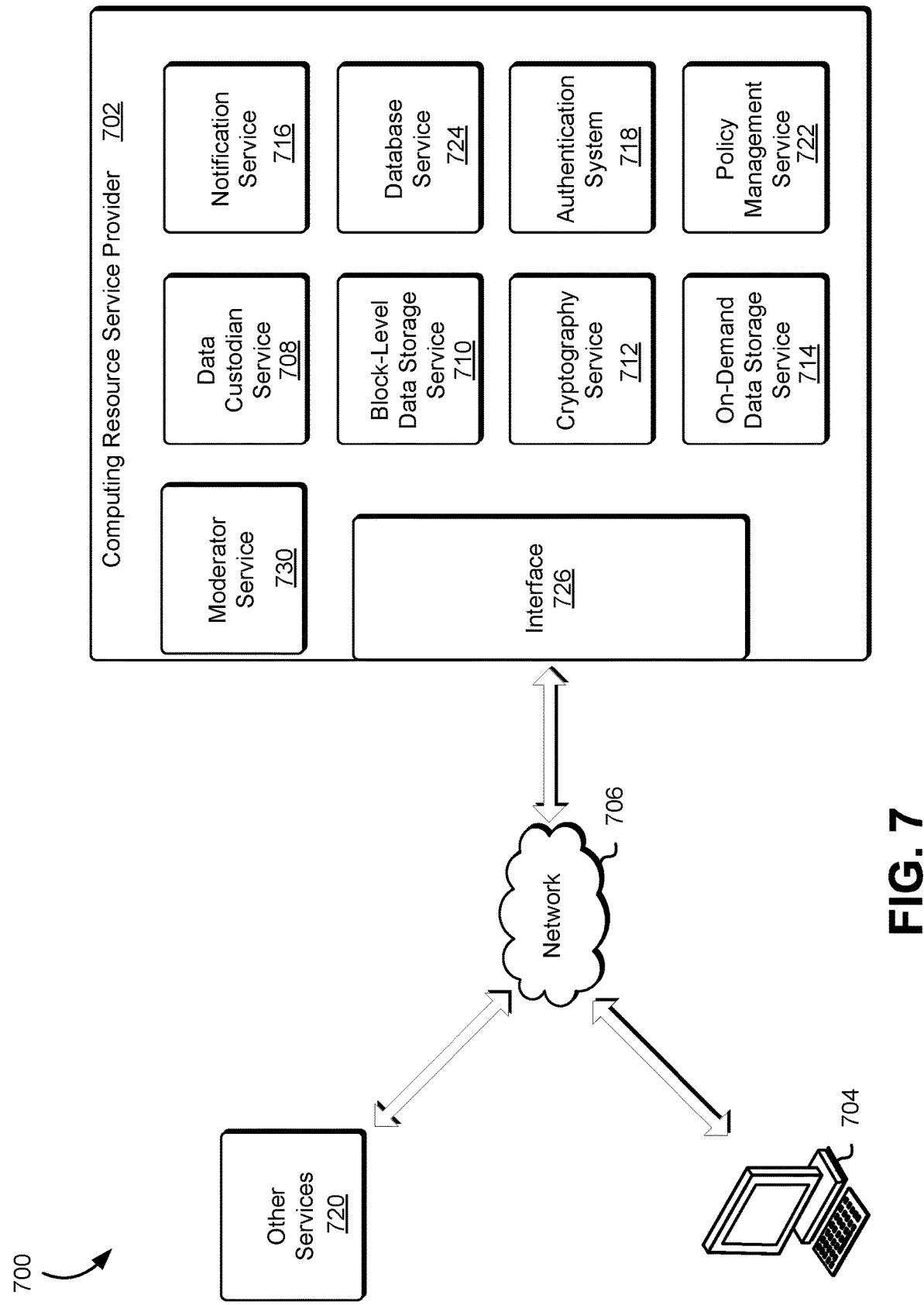
FIG. 7 illustrates an environment in which a moderator service translates an operation of an application to be processed by a data store based at least in part on information from other services in accordance with at least one embodiment.

FIG. 7 shows an environment 700 in which a customer 704 connected to a computing resource service provider in accordance with at least one embodiment. The computing resource service provider 702 may provide a variety of services to the customer 704 and the customer 704 may communicate with the computing resource service provider 702 via an interface 726, which may be a web services interface or any other type of customer interface. While FIG. 7 shows one interface 726 for the services of the computing resource service provider 702, each service may have its own interface and, generally, subsets of the services may have corresponding interfaces in addition to or as an alternative to the interface 726. The customer 704 may be an organization or users as described above that may utilize one or more of the services provided by the computing resource service provider 702 to maintain and deliver information and/or services to other customers and/or users, which may be located in various geographical locations. In addition, the customer 704 may include an application as described above that is extended or otherwise modified by the moderator service 730.

Additionally, the customer 704 may be an individual that utilizes the services of the computing resource service provider 702 to deliver content or provide services to computing resources or other entities located remotely, for example, through the use of the application as described above. As shown in FIG. 7, the customer 704 may communicate with the computing resource service provider 702 through a network 706; the network 706 may be a communication network, such as the Internet, an intranet or an Internet service provider (ISP) network. Some communications from the customer 704 to the computing resource service provider 702 may cause the computing resource service provider 702 to operate in accordance with one or more embodiments described in the present disclosure or variations thereof.

The computing resource service provider 702 may provide various computing resource services to the customer 704. The services provided by the computing resource service provider 702, in this example, include a moderator service 730, a data custodian service 708, a block-level data storage service 710, a cryptography service 712, an on-demand data storage service 714, a notification service 716, an authentication system 718, a policy management service 722, and a database service 724. In addition, the moderator service 730 may have access to one or more other services 720 as described in greater detail below. The other services 720, in various embodiments, are provided by separate entity from the computing resource service provider 702. In one example, the other services 720 includes computing resources in a data center operated by the customer 704.

It is noted that not all embodiments described include the services 708-730 described with reference to FIG. 7 and additional services may be provided in addition to or as an alternative to services explicitly described, such as a compute service or a task service. As described, each of the services 708-730 may include one or more web service interfaces that enable the customer 704 to submit service calls such as appropriately configured API calls to the various services through web service requests. In addition, each of the services may include one or more service interfaces that enable the services to access each other (e.g., to enable moderator service 730 to extend or otherwise provide additional functionality to the application by at least enabling the application to utilize computing resources of the services 708-730 described with reference to FIG. 7).

In various embodiments, the compute service includes one or more server computer systems providing physical resources used to instantiate virtual machine instances and/or container instances on behalf of the customer 704. For example, a server computer includes a hypervisor that provide virtual machines with access to the underlying physical resources of the server computer system such as memory and processors. The customer 704 may interact with the compute service (e.g., via appropriately configured and authenticated API calls) to provision and operate computing resources that are instantiated on physical computing devices hosted and operated by the computing resource service provider 702. The virtual machine instances and/or container instances may be used for various purposes, such as to operate as servers supporting a website, to operate business applications or, generally, to serve as computing power for the customer 704 and/or the applications and services operated by the customer 704. Other applications for the virtual machine instances and/or container instances may be to support database applications, electronic commerce applications, business applications, and/or other applications. In addition, any other computer system or computer system service may be utilized in the computing resource service provider 702, such as a computer system or computer system service that does not employ virtualization or instantiation and instead provisions computing resources on dedicated or shared computers/servers and/or other physical devices. Furthermore, the computer service may be used to provide instances of a moderator as described above.

In various embodiments, the block-level data storage service 710 includes one or more computing resources that collectively operate to store data for the customer 704 using block-level storage devices (and/or virtualizations thereof). The block-level storage devices of the block-level data storage service 710 may, for instance, be operationally attached to virtual computer systems provided by the compute service to serve as logical units (e.g., virtual drives) for the computer systems. A block-level storage device may enable the persistent storage of data used/generated by a corresponding virtual computer instance and/or container instance where the compute service may only provide ephemeral data storage.

As illustrated in FIG. 7, the computing resource service provider 702 also includes a cryptography service 712. The cryptography service 712 may utilize one or more storage services of the computing resource service provider 702 to store keys of the customers in encrypted form, whereby the keys may be usable to decrypt customer keys accessible only to particular devices of the cryptography service 712. In general, the cryptography service 712 may perform various cryptographic operations on behalf of customers 704, services, and/or applications. For example, the cryptography service 712 receives data objects, encrypts the data objects with a particular cryptographic key, and returns an encrypted data object. Similarly, the cryptography service 712 may decrypt an encrypted data object in response to validated and/or authorized requests.

In various embodiments, the computing resource service provider 702 further includes an on-demand data storage service 714. The on-demand data storage service 714 may be implemented using one or more server computer systems providing physical resources used to synchronously process requests to store and/or access data. The on-demand data storage service 714 may operate using computing resources (e.g., databases, block-level storage devices, physical hosts, etc.) that enable the on-demand data storage service 714 to locate and retrieve data quickly, and to allow data to be provided in response to requests for the data. For example, the on-demand data storage service 714 maintains stored data in a manner such that, when a request for a data object is retrieved, the data object can be provided (or streaming of the data object can be initiated) in a response to the request.

As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects that may be used by the customer 704 to retrieve or perform other operations in connection with the data objects stored by the on-demand data storage service 714.

In the environment illustrated in FIG. 7, a notification service 716 is included. The notification service 716 includes one or more server computer systems providing physical resources used to provide notification to customers 704 through various mechanisms such as a web service or other interface. The notification service 716 can be used to configure topics for which customers 704 seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 716 may provide notifications to clients using a "push" mechanism without the need to check periodically or "poll" for new information and updates. The notification service 716 may further be used for various purposes such as monitoring applications executing in the compute service, workflow systems, time-sensitive information updates, mobile applications, and many others.

As illustrated in FIG. 7, the computing resource service provider 702, in various embodiments, includes an authentication system 718 and a policy management service 722. The authentication system 718, in an embodiment, is a computer system (e.g., one or more server computer systems) that performs operations involved in authentication of users and/or customers 704. For instance, one of the services 708-716 and 722-730 may provide information from a user to the authentication system 718 to receive information in return that indicates whether the user requests are authentic.

The policy management service 722, in an embodiment, is a computer system configured to manage policies on behalf of customers 704 of the computing resource service provider 702. The policy management service 722 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 702, in various embodiments, is also equipped with a task service. The task service, in an embodiment, receives a set of tasks included in a workflow and/or plug-in and enables execution of tasks as dictated by the workflow. The task service may utilize various resources of the computing resource service provider 702, such as one or more instantiated virtual machines or virtual hosts, for executing tasks and/or operations thereof. For example, the task service executes a set of operations to fulfill a translated operation generated by the moderator service 730.

Additionally, other entities may provide the one or more other services 720 based at least in part on the needs of its customers 704. In one example, the one or more other services 720 includes a database service 724 exposed to customer 704. The database service 724 may include computing resources that operate to execute one or more databases for one or more customers 704. The moderator service 730, in various embodiments, communicates with the other services 720, as described above in connection with FIG. 3, over the network 706 to provide functionality of the one or more other services 720 to the application. As illustrated in FIG. 7, and described in the present disclosure, a service may include any computing resources that receive requests and process the requests. For example, a service includes a container instance that receives and processes information.

Figure 8:
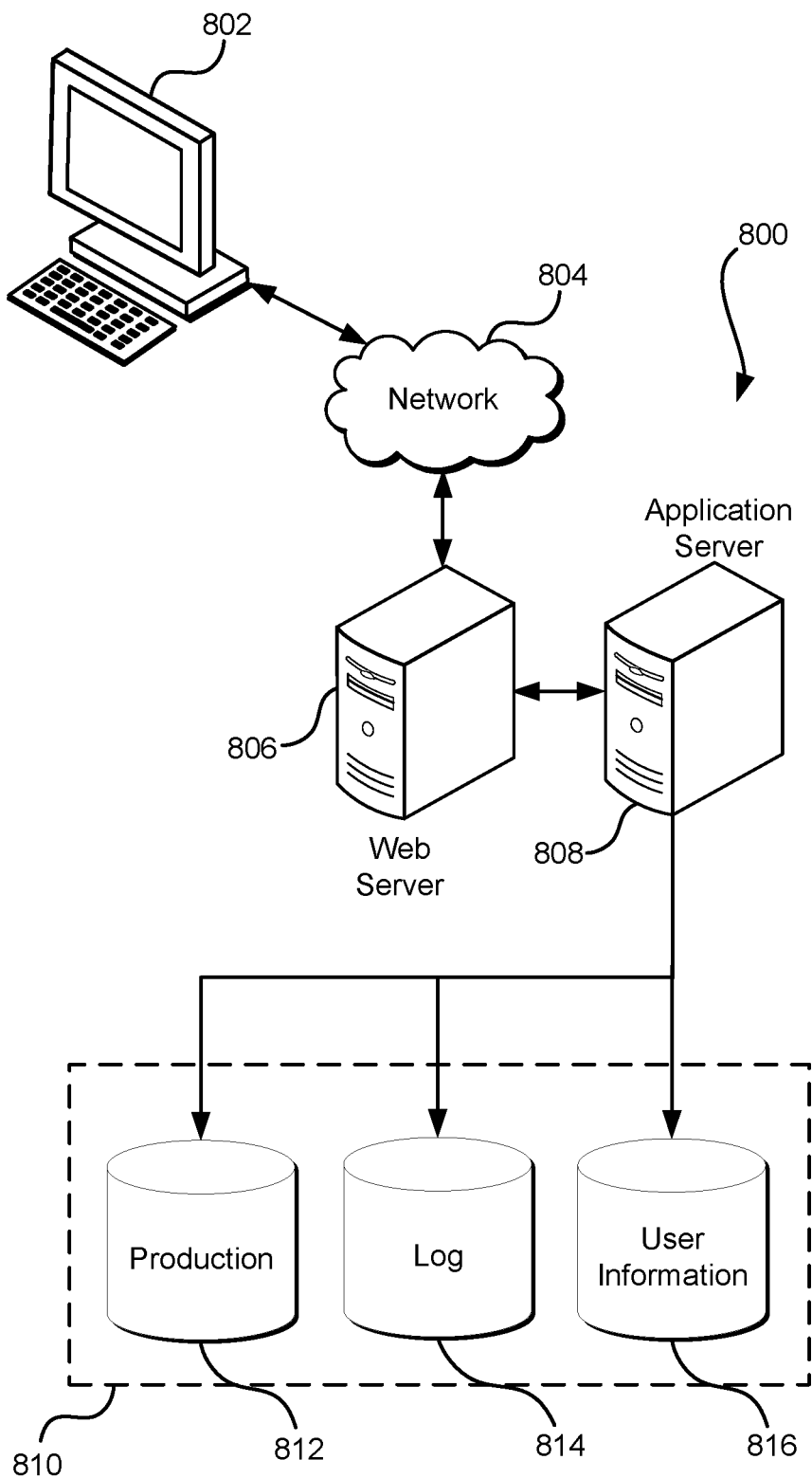
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request generated by an application in accordance with a first format;
   parsing the request to detect sensitive information associated with the request;
   based at least on the sensitive information associated with the request, obtaining policy information from a policy service, the policy information to permit access of the sensitive information associated with the request;
   providing a portion of the request to a data custodian service to obtain encrypted sensitive information associated with the request;
   translating the request in accordance with a second format to generate a translated request, the translated request including a modifying operation against a schemaless database and the encrypted sensitive information associated with the request, the translated request further including at least a portion of the policy information obtained to permit access of at least a portion of the sensitive information associated with the request; and
   transmitting the translated request to a data store for processing.

2. The computer-implemented method of claim 1, wherein computer-implemented method further comprises maintaining, by a moderator, metadata indicating a data storage schema of the data stored.

3. The computer-implemented method of claim 2, wherein translating the request further comprises selecting the data store from a plurality of data stores accessible to the moderator, where the application uses a single data store.

4. The computer-implemented method of claim 2, wherein obtaining the encrypted sensitive information further comprises:
   requesting a cryptographic key from the data custodian service; and
   encrypting, by the moderator, the sensitive information to generate the encrypted sensitive information.

5. The computer-implemented method of claim 1, wherein the request comprises a structured query language (SQL) database command against a schema.

6. A system, comprising:
   at least one computing device implementing one or more services, wherein the one or more services:
   receive a modification command from a computing resource executing an application, the modification command formatted in accordance with a first format;
   determine the modification command includes sensitive information;
   interact with at least one other computer system to cause the sensitive information included in the modification command to be obfuscated to generate obfuscated information;
   translate the modification command to comply with a second format distinct from the first format, thereby generating a translated modification command, the translated modification command including the obfuscated information and schema information modified according to additional information absent from the modification command; and
   fulfill the translated modification command by providing the translated modification to a computing resource to process the translated modification command that complies with the second format.

7. The system of claim 6, wherein the one or more services convert a data object of a first type to a data object of a second type based at least in part on the second format.

8. The system of claim 7, wherein converting the data object to the second type further comprises generating a hash of the data object to reduce an amount of computing recourses used to store that data object.

9. The system of claim 6, wherein the modification command includes a search of a data store, where a result of the search includes the obfuscated information.

10. The system of claim 9, wherein the one or more services modify a parameter of the search of the data store based at least in part on unobfuscating the obfuscated information.

11. The system of claim 6, wherein generating the obfuscated information further includes a moderator tokenizing the information based at least in part on information maintained by a data custodian service.

12. The system of claim 6, wherein the one or more services transmit the translated modification command to a database that processes commands according to the second format.

13. The system of claim 12, wherein the translated modification command causes the database to create an entry in a database table including the obfuscated information.

14. A non-transitory computer-readable storage medium storing thereon executable instructions that, as a result of being executed by one or more processors of a computer system, cause the computer system to at least:
- obtain information indicating a set of operations generated by an application, the set of operations generated based at least in part on a first syntax;
- obtain other information based on the set of operations generated by the application, the other information associated with fulfilling at least one operation of the set of operations;
- determine at least one put operation of the set of operations includes sensitive information to be used during performance of the at least one put operation;
- translate the set of operations to comply with a second syntax thereby generating a set of translated operations, the set of translated operations including schema information modified according to additional information absent from the set of operations and at least one translated put operation including obfuscated sensitive information corresponding to the sensitive information to be used during performance of the at least one put operation, the set of translated operations further including the other information associated with fulfilling the at least one operation of the set of operations; and
- cause the translated set of operations to be fulfilled by communicating the translated set of operations to a computing resource able to process operations according to the second syntax.

15. The non-transitory computer-readable storage medium of claim 14, wherein the instructions further comprise instructions that, as a result of being executed by the one or more processors, cause the computer system to obtain the obfuscated sensitive information from a service of a computing resource service provider in response to a request.

16. The non-transitory computer-readable storage medium of claim 15, wherein the service is a data custodian service and the obfuscated sensitive information includes tokenized information generated by the data custodian service based at least in part on the sensitive information.

17. The non-transitory computer-readable storage medium of claim 15, wherein the instructions that cause the computer system to obtain the obfuscated sensitive information from the service further include instructions that cause the computer system to:
- obtain a cryptographic key from the service; and
- generate the obfuscated sensitive information by at least encrypting the sensitive information with the cryptographic key.

18. The non-transitory computer-readable storage medium of claim 15, wherein the instructions that cause the computer system to obtain the obfuscated sensitive information from the service further include instructions that cause the computer system to transmit the sensitive information to the service, where the service is responsible for generating the obfuscated sensitive information.

19. The non-transitory computer-readable storage medium of claim 14, wherein the instructions that cause the computer system to translate the set of operations further include instructions that cause the computer system to translate the set of operations to be processed by a database instance provided by a database service of a computing resource service provider.

20. The non-transitory computer-readable storage medium of claim 14, wherein the instructions that cause the computer system to determine at least one put operation includes sensitive information further include instructions that cause the computer system to:
- parse the at least one put operation; and
- determine the at least one put operation includes sensitive information based at least in part on a schema associated with a database used to store the sensitive information.

21. The non-transitory computer-readable storage medium of claim 20, wherein the instructions further comprise instructions that, as a result of being executed by the one or more processors, cause the computer system to determine the schema associated with the database used to store the sensitive information based at least in part on the set of operations.

* * * * *